W. OLDENDORF.
TRACTOR GUIDE.
APPLICATION FILED MAR. 17, 1921.
1,388,057.
Patented Aug. 16, 1921.
2 SHEETS—SHEET 1.
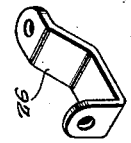
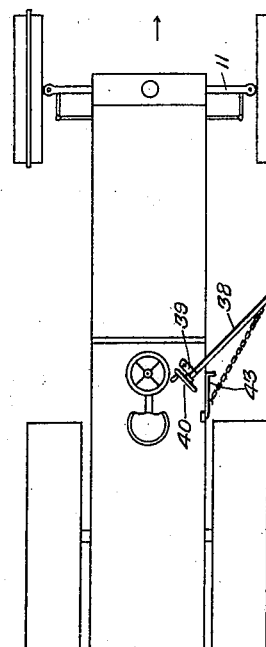
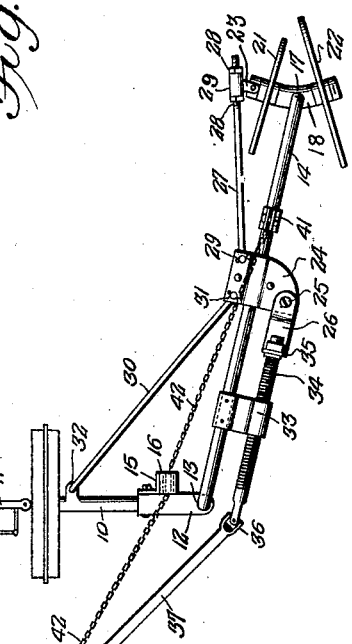
Inventor
William Oldendorf,
By
Geo. P. Kimmel, Attorney

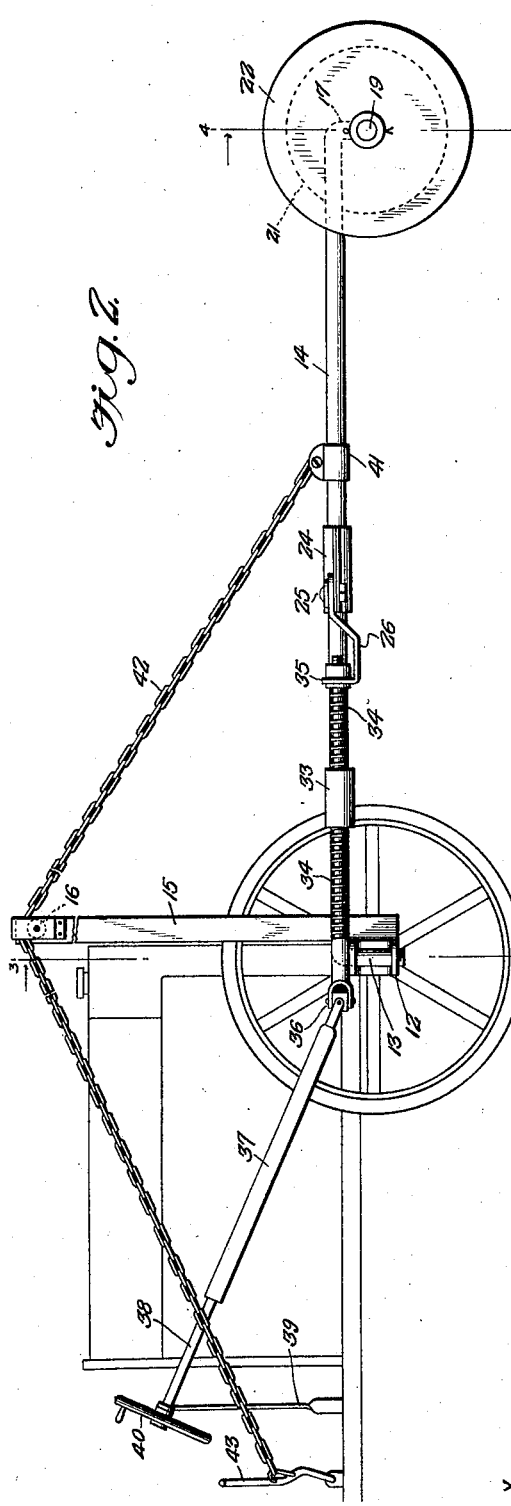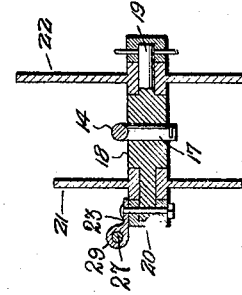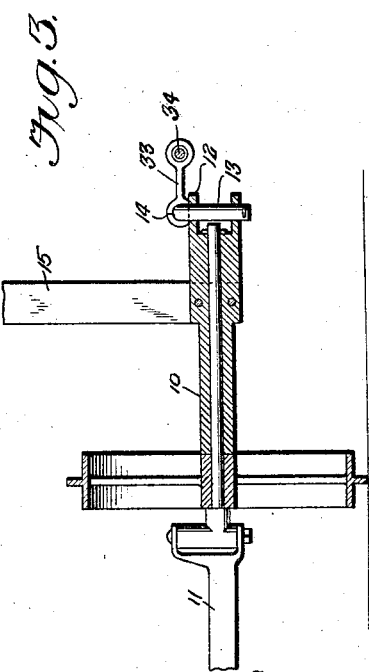

UNITED STATES PATENT OFFICE.

WILLIAM OLDENDORF, OF RUSHFORD, MINNESOTA.

TRACTOR-GUIDE.

1,388,057.  Specification of Letters Patent.  Patented Aug. 16, 1921.

Application filed March 17, 1921. Serial No. 453,027.

*To all whom it may concern:*

Be it known that I, WILLIAM OLDENDORF, a citizen of the United States, residing at Rushford, in the county of Fillmore and State of Minnesota, have invented certain new and useful Improvements in Tractor-Guides, of which the following is a specification.

This invention relates to guide devices for tractors, more particularly to tractors when employed in drawing plows and like implements, and has for one of its objects to simplify and improve the construction and increase the efficiency and utility of devices of this character.

Another object of the invention provides a device of this character which may be readily adapted without structural change to various forms of tractors or like vehicles.

Another object of the invention is to provide a device of this character which may be readily controlled from the seat of the tractor by the operator without leaving his seat or interfering with the operation of the various devices.

Another object of the invention is to provide a device of this character whereby the guide devices may be elevated free of the ground when the tractor is to be moved from place to place or when turning corners at the end of a furrow.

With these and other objects in view the invention consists of such novel features of construction as hereinafter shown and described and then specifically pointed out in the claims, and in the drawings illustrative of the preferred embodiment of the invention.

Figure 1 is a plan view of the improved apparatus, attached to a conventional tractor device.

Fig. 2 is a side elevation of the same.

Fig. 3 is an enlarged sectional detail of the support for the swinging beam member.

Fig. 4 is an enlarged sectional detail of the furrow wheels and their axles.

Fig. 5 is an enlarged sectional detail of the screw operating device.

Fig. 6 is an enlarged perspective view of the coupling member between the slidable sleeve and the screw.

The improved device may be adapted without material structural change to the different makes of farm tractors, and comprises in general a support 10 having means for attachment to some suitable part of the tractor, for instance to the forward axle 11 as shown.

At its outer end the support 10 is provided with a bearing 12 to receive the down turned end 13 of a beam device 14, the latter being thus mounted to swing laterally relative to the support and likewise to swing vertically with the rotary movement of the support upon the axle 11.

Rising from the support 10 is a standard 15 having a guide pulley 16 at its upper end.

At its free end the beam 14 is downturned as at 17 and received in an axle member 18 having journals 19 and 20 at the ends, the axle member being curved, as shown in Fig. 1 so that the journals are directed in reversely angular directions. A furrow wheel 21 of relatively small diameter is mounted for rotation on the axle 20, while a furrow wheel 22 of relatively large diameter is mounted for rotation on the axle 19, as shown.

Coupled to swing upon the axle 20 is a clip device 23.

The furrow wheels stand at angles to each other as shown in Fig. 1.

Slidable on the beam 14 is a sleeve 24, and pivoted at 25 to the sleeve is a coupling member 26.

The swinging clip 23 includes a sleeve 29 through which a rod 27 is engaged and threaded to receive adjusting nuts 28.

At its rear end the rod 27 is pivoted at 29 to the slidable sleeve 24, while another rod 30 is pivoted at one end at 31, to the sleeve 24 and at the other end to a lug 32 extending from the support 10.

Attached to the beam 14 is a bracket member 33 threaded to receive a screw 34, the screw being swiveled at its forward end at 35 to the member 26.

Coupled by a universal joint 36 to the screw 34 is a tubular rod 37 having its bore square or other form than round, and slidable in the bore of the tubular member is a rod 38 having square portions to fit the member 37.

Rising from the framework of the tractor is a standard 39 in the upper end of which rod 38 is journaled and provided with an operative hand wheel 40.

The wheel 40 is disposed at a convenient position relative to the seat of the tractor, to be in convenient position for the operator.

By rotating the screw, the sleeve 24 is adjusted to move the beam 14 away from or toward the line of travel of the tractor. The wheels 21 and 22 operate in the furrow which has just been made by the tractor and thus guide the tractor in parallel relation to the furrow recently made.

Coupled to the beam 14 is a clip 41 and connected to the clip is a chain 42 which extends over the guide pulley 16 to a hand lever 43, mounted to swing on the frame of the tractor convenient to the hand of the operator.

Furrow wheels capable of adjustment from the driver's seat to control the direction of movement of the tractor and the guide device may be elevated to any required extent to remove the furrow wheels from the soil while the tractor is being moved from place to place or when turning a corner at the end of a furrow.

The improved device is simple in construction and can be inexpensively manufactured, of any suitable material, and operates effectually for the purpose described.

The preferred embodiment of the invention is disclosed in the drawings and set forth in the specifications, but it will be understood that any modifications within the scope of the claims may be made in the construction without departing from the principle of the invention or sacrificing any of its advantages.

Having thus described the invention what is claimed as new is:—

1. A device of the class described, comprising a support adapted to be coupled to a vehicle, a beam member swinging at one end upon said support, an axle device swinging upon the free end of the beam and having reversely arranged angular journals, furrow wheels of different sizes mounted on said journals, a threaded bracket projecting from said beam, a screw engaging said bracket, a sleeve slidable on said beam, and coupled to said screw, a pull rod pivoted respectively to said sleeve and to one of said axles, a pull rod pivoted respectively to said sleeve and to said support, and means operative from the vehicle for rotating said screw to adjust the beam to cause the furrow wheels to operate nearer to or farther from the line of travel of the vehicle.

2. A device of the class described, comprising a support adapted to be coupled to a vehicle, a beam member swinging at one end upon said support, an axle device swinging upon the free end of the beam and having reversely arranged angular journals, furrow wheels of different sizes mounted on said journals, a sleeve slidable on said beam, a pull rod pivoted respectively to said sleeve and to one of said axles, a pull rod pivoted respectively to said sleeve and to said support, and means operative from the vehicle to adjust the sleeve to cause the furrow wheels to operate nearer to or farther from the line of travel of the vehicle.

In witness whereof, I affix my signature hereto.

WILLIAM OLDENDORF.